United States Patent
Yamazaki

(10) Patent No.: US 12,541,880 B2
(45) Date of Patent: Feb. 3, 2026

(54) CAMERA CALIBRATION METHOD, AND STEREO CAMERA DEVICE

(71) Applicant: HITACHI ASTEMO, LTD., Hitachinaka (JP)

(72) Inventor: Kazuyoshi Yamazaki, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/719,892

(22) PCT Filed: Nov. 25, 2022

(86) PCT No.: PCT/JP2022/043470
§ 371 (c)(1),
(2) Date: Jun. 14, 2024

(87) PCT Pub. No.: WO2023/127362
PCT Pub. Date: Jul. 6, 2023

(65) Prior Publication Data
US 2025/0054190 A1   Feb. 13, 2025

(30) Foreign Application Priority Data
Dec. 27, 2021  (JP) ................. 2021-211911

(51) Int. Cl.
*G06T 7/80* (2017.01)
*G06T 5/80* (2024.01)

(52) U.S. Cl.
CPC ............. *G06T 7/85* (2017.01); *G06T 5/80* (2024.01); *G06T 2207/10012* (2013.01); *G06T 2207/30184* (2013.01); *G06T 2207/30252* (2013.01)

(58) Field of Classification Search
None
See application file for complete search history.

(56) References Cited

U.S. PATENT DOCUMENTS

| 6,381,360 B1 | 4/2002 | Sogawa |
| 2016/0316192 A1 | 10/2016 | Kishiwada |

(Continued)

FOREIGN PATENT DOCUMENTS

| EP | 2 902 967 A1 | 8/2015 |
| EP | 3 505 865 A1 | 7/2019 |

(Continued)

OTHER PUBLICATIONS

Espacenet translation of the description of Ohara (JP2019-090755 A referred to as "Ohara" throughout) (Year: 2019).*

(Continued)

*Primary Examiner* — Tyler W. Sullivan
(74) *Attorney, Agent, or Firm* — Foley & Lardner LLP

(57) ABSTRACT

A camera calibration method for calibrating a camera that captures an image through a windshield includes acquiring a calibration image associated with a calibration object by imaging by the camera. A calibration object has a linear portion extending in one direction intersecting an optical axis of the camera through the windshield, and the calibration object is a wire or a bar. The method further includes extracting a first linear portion image corresponding to the linear portion from the calibration image. The method further includes correcting distortion of the calibration image by comparing the first linear portion image with a second linear portion image captured when the linear portion is imaged by the camera not through the windshield.

9 Claims, 17 Drawing Sheets

(56) References Cited

U.S. PATENT DOCUMENTS

| | | | |
|---|---|---|---|
| 2021/0080253 A1* | 3/2021 | Newkirk | G01B 11/275 |
| 2022/0215529 A1* | 7/2022 | Krueger | G06T 7/80 |
| 2023/0005183 A1* | 1/2023 | Cantadori | G07C 5/0808 |

FOREIGN PATENT DOCUMENTS

| | | | | |
|---|---|---|---|---|
| JP | 2001-091245 A | | 4/2001 | |
| JP | 2004-173037 A | | 6/2004 | |
| JP | 2010-249965 A | | 11/2010 | |
| JP | 2016-204249 A | | 12/2016 | |
| JP | 2017032280 A | * | 2/2017 | |
| JP | 2017-062150 A | | 3/2017 | |
| JP | 2017-062198 A | | 3/2017 | |
| JP | WO2018-042954 A1 | | 3/2018 | |
| JP | 062019 | * | 6/2019 | |
| JP | 2019-132855 A | | 8/2019 | |
| JP | 2021-025868 A | | 2/2021 | |
| WO | WO-2021150369 A1 * | | 7/2021 | H04N 13/243 |
| WO | WO-2023041436 A1 * | | 3/2023 | G01N 21/958 |

OTHER PUBLICATIONS

Espacenet translation of the description of Nakayama (JP2017-032280 A referred to as "Nakayama" throughout) (Year: 2017).*
Espacenet provided translation of the description of Veit (WO2023/041436 A1 referred to as "Veit" throughout) (Year: 2021).*
International Search Report with English Translation and Written Opinion of International Patent Application No. PCT/JP2022/043470 dated Feb. 14, 2023 (8 pages).
Japanese Office Action issued in corresponding JP Patent Application No. 2021-211911, dated Jul. 8, 2025 with English translation (6 pages).

* cited by examiner

CAMERA CALIBRATION METHOD, AND STEREO CAMERA DEVICE

TECHNICAL FIELD

The present disclosure relates to a camera calibration method and a stereo camera device.

BACKGROUND ART

Conventionally, an invention related to a calibration method of a stereo camera including a first camera and a second camera and imaging a subject via a transparent body is known. For example, a stereo camera calibration method described in PTL 1 below includes a step of calculating a correction parameter for calibrating an absolute positional deviation indicating a deviation of coordinates of an image of a subject caused by a transparent body in at least one of an image captured by a first camera and an image captured by a second camera.

In addition, this conventional calibration method includes steps of imaging a calibration tool by the stereo camera to acquire a first captured image by the first camera and a second captured image by the second camera, and calculating a correction parameter for calibrating a relative positional deviation indicating a deviation in parallax between the image of the subject in the first captured image and the image of the subject in the second captured image based on the first captured image and the second captured image. Furthermore, this conventional calibration method includes a step of causing the stereo camera to store a correction parameter based on the correction parameter for calibrating the absolute positional deviation and the correction parameter for calibrating the relative positional deviation (PTL 1, claim 1, etc.).

CITATION LIST

Patent Literature

PTL 1: JP 2019-132855 A

SUMMARY OF INVENTION

Technical Problem

In the conventional stereo camera calibration method, the calibration tool is imaged by the stereo camera, and the relative positional deviation and the absolute positional deviation are calibrated. Therefore, in this conventional calibration method, if the angle of view of the stereo camera is increased, the calibration tool may be increased in size, and it may be difficult to calibrate the stereo camera.

The present disclosure provides a camera calibration method and a stereo camera device capable of easily calibrating a wide-angle camera that captures an image through a windshield.

Solution to Problem

One aspect of the present disclosure is a camera calibration method for capturing an image through a windshield, the method including: acquiring a calibration image by imaging, by a camera, a calibration object including a linear portion extending in one direction intersecting an optical axis of the camera through the windshield; extracting a linear portion image corresponding to the linear portion from the calibration image; and correcting distortion of the calibration image based on the linear portion image and a virtual linear portion image assumed in a case where the linear portion is imaged by the camera without through the windshield.

Advantageous Effects of Invention

According to the above aspect of the present disclosure, it is possible to provide an image calibration method capable of easily calibrating a wide-angle camera that captures an image through a windshield.

DESCRIPTION OF EMBODIMENTS

Hereinafter, embodiments of a camera calibration method and a stereo camera device according to the present disclosure will be described with reference to the drawings.

First Embodiment

Figure 1:
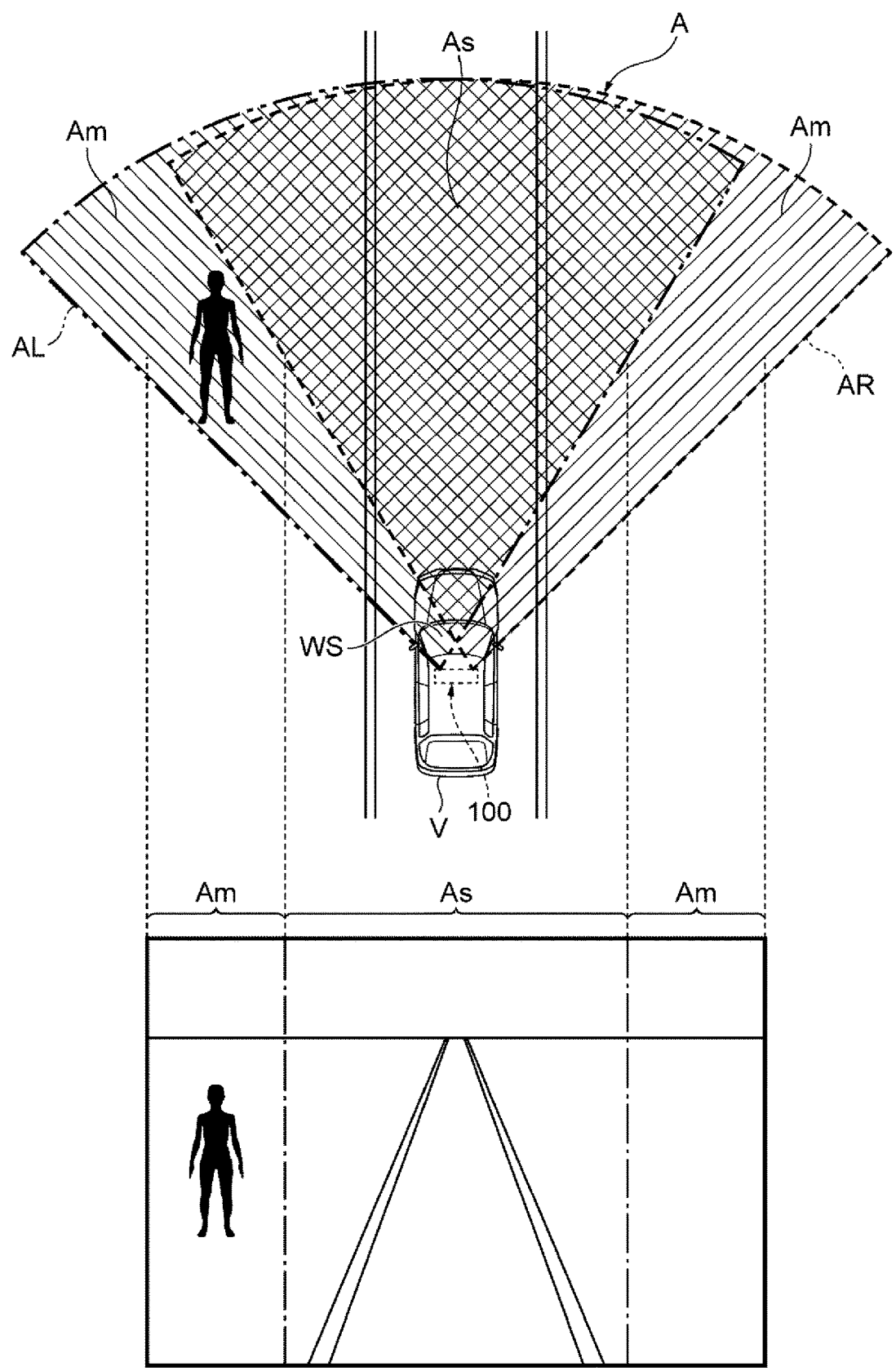
FIG. 1 is a plan view and an image view illustrating an embodiment of a stereo camera device according to the present disclosure.
Figure 2:
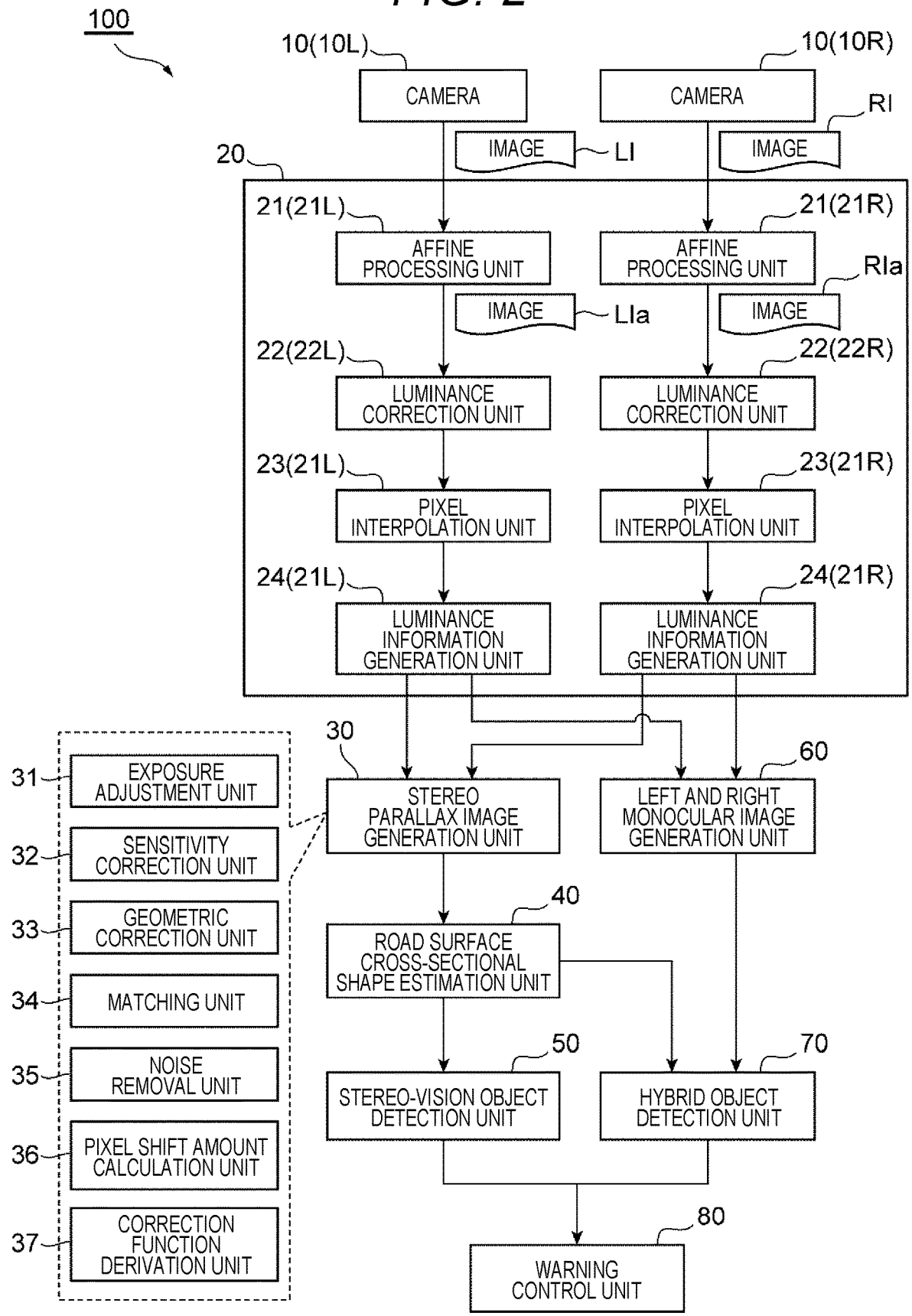
FIG. 2 is a block diagram illustrating an example of a configuration of the stereo camera device of FIG. 1.

FIG. 1 is a plan view and an image view illustrating the first embodiment of a stereo camera device according to the present disclosure. FIG. 2 is a block diagram illustrating an example of a configuration of a stereo camera device 100 of FIG. 1.

As illustrated in FIG. 1, the stereo camera device 100 of the present embodiment is mounted on a vehicle V such as an automobile, for example, detects external information including an object around the vehicle V and a distance to the object through a windshield WS of the vehicle V, and generates a warning as necessary. The external information detected by the stereo camera device 100 or the generated warning is used, for example, for automatic driving or advanced driving assistance of the vehicle V by a vehicle control device (not illustrated).

As illustrated in FIG. 2, the stereo camera device 100 includes left and right cameras 10L and 10R which capture images LI and RI through the windshield WS of the vehicle V. Each camera 10 includes, for example, a lens (not illustrated) and an image sensor, and captures or acquires an image of an object around the vehicle V through the lens by the image sensor. Each camera 10 is, for example, a wide-angle camera having a horizontal view angle of about 110° to 150°.

As illustrated in FIG. 1, an imaging area A of the stereo camera device 100 by the left and right cameras 10L and 10R includes, for example, a stereo-vision area As at the center and monocular-vision areas Am on the left and right of the stereo-vision area As. The stereo-vision area As at the center is an area where an imaging areas AL and AR of the left and right cameras 10L and 10R overlap. The monocular-vision area Am on the left side of the stereo-vision area As is an imaging area AL of the left camera 10L and is an area outside the imaging area AR of the right camera 10R. The monocular-vision area Am on the right side of the stereo-vision area As is an imaging area AR of the right camera 10R and is an area outside the imaging area AL of the left camera 10L.

Furthermore, for example, as illustrated in FIG. 2, the stereo camera device 100 includes an image processing unit 20, a stereo parallax image generation unit 30, a road surface cross-sectional shape estimation unit 40, a stereo-vision object detection unit 50, a left and right monocular image generation unit 60, a hybrid object detection unit 70, and a warning control unit 80. Each unit of the stereo camera device 100 can be configured by, for example, one or more microcontrollers including a central processing unit (CPU), a memory such as a ROM or a RAM, a timer, an input/output unit, and a program recorded in the memory.

The image processing unit 20 acquires an image LI and an image RI from the left and right cameras 10L and 10R, respectively, performs image processing, and outputs image data generated by the image processing to the stereo parallax image generation unit 30 and the left and right monocular image generation unit 60. For example, as illustrated in FIG. 2, the image processing unit 20 includes an affine processing unit 21, a luminance correction unit 22, a pixel interpolation unit 23, and a luminance information generation unit 24 for each of the left and right cameras 10L and 10R. Each unit of the image processing unit 20 represents, for example, a function realized by executing a program recorded in the memory by the CPU.

Left and right affine processing units 21L and 21R generate converted images LIa and RIa obtained by affine transform of the image LI of the left camera 10L and the image RI of the right camera 10R, respectively. Furthermore, in a case where the left and right cameras 10L and 10R are equipped with a fisheye lens or a wide-angle lens, for example, each affine processing unit 21 generates converted images LIa and RIa obtained by projection-transforming the image height y=f·sin θ of an orthographic lens of a focal length f and a half angle of view e into a coordinate system of (f·tan θx, f·tan θy). Note that θx and θy represent angle components with respect to the horizontal and vertical directions of light injected on the lens.

Further, the left and right affine processing units 21L and 21R generate, for example, converted images LIa and RIa in which pixel shift that is shift of the pixel in the vertical direction due to the refraction of the light transmitted through the windshield WS is corrected. That is, each affine processing unit 21 functions as, for example, a pixel shift correction unit which corrects a pixel shift.

The left and right luminance correction units 22L and 22R each correct luminance of each pixel of the converted image LIa of the image LI of the left camera 10L and luminance of each pixel of the converted image RIa of the image RI of the right camera 10R. Each of the luminance correction units 22 corrects the luminance of each pixel based on, for example, a difference in gain of each pixel of the converted images LIa and RIa.

The left and right pixel interpolation units 23L and 23R each perform, for example, demosaicing processing on the converted images LIa and RIa in which the luminance has been corrected, and convert the converted images LIa and RIa from RAW images to color images. The left and right luminance information generation units 24L and 24R each generate luminance information of the converted images LIa and RIa converted into color images. More specifically, each of the luminance information units generation 24 generates luminance information for generating a parallax image from information of the color images of the converted images LIa and RIa.

The stereo parallax image generation unit 30 generates a stereo parallax image of the stereo-vision area As using the image of the stereo-vision area As in the converted images LIa and RIa input from the image processing unit 20. The stereo parallax image generation unit 30 includes, for example, an exposure adjustment unit 31, a sensitivity correction unit 32, a geometric correction unit 33, matching unit 34, a noise removal unit 35, a pixel shift amount calculation unit 36, and a correction function derivation unit 37. Each unit of the stereo parallax image generation unit 30 represents, for example, a function realized by executing a program recorded in the memory by the CPU.

The exposure adjustment unit 31 and the sensitivity correction unit 32 can each perform feedback control by feeding back the exposure amount and sensitivity of the left and right cameras 10L and 10R to the left and right cameras 10L and 10R. The geometric correction unit 33, the matching unit 34, and the noise removal unit 35 each perform geometry correction, matching processing, and noise removal on the left and right converted images LIa and RIa. The pixel shift amount calculation unit 36 and the correction function derivation unit 37 calculate the pixel shift amounts of the left and right converted images LIa and RIa and derive a correction function to be described later, respectively. That is, the pixel shift amount calculation unit 36 and the correction function derivation unit 37 form a pixel shift correction unit together with the affine processing unit 21, for example.

The road surface cross-sectional shape estimation unit 40 estimates, for example, the cross-sectional shape of a road surface on which the vehicle V will travel ahead in the optical axis direction of the left and right cameras 10L and 10R of the stereo camera device 100. The estimation of the cross-sectional shape of the road surface by the road surface cross-sectional shape estimation unit 40 can be performed by, for example, a known method.

The stereo-vision object detection unit 50 detects an object in the stereo-vision area As using the stereo parallax image generated by the stereo parallax image generation unit 30. The stereo-vision object detection unit 50 further applies stereo matching to the detected object to detect parallax, and applies pattern matching, for example, to specify the type of object such as a pedestrian, a bicycle, a vehicle, or a building.

The left and right monocular image generation unit 60 generates images of the left and right monocular-vision areas Am of the left and right converted images LIa and RIa as left and right monocular-vision images. For example, the left and right monocular image generation unit 60 projectively converts the images of the left and right monocular-vision areas Am in the left and right converted images LIa and RIa so that the unit length of the left and right monocular-vision images and the unit length of the stereo parallax image along the same horizontal line represent the same distance.

The hybrid object detection unit 70 generates, for example, one hybrid image obtained by combining the stereo parallax image generated by the stereo parallax image generation unit 30 and the left and right monocular-vision images generated by the left and right monocular image generation unit 60. That is, the hybrid image has, for example, a stereo parallax image at the center in the horizontal direction, and monocular-vision images on the left and right of the stereo parallax image.

The hybrid object detection unit 70 further detects an object based on the generated hybrid image. More specifically, for example, the hybrid object detection unit 70 detects an object from the monocular-vision image of the hybrid image, and detects the distance to the object of the monocular-vision image based on information such as parallax in the stereo parallax image of the hybrid image.

More specifically, for example, similarly to the stereo-vision object detection unit 50, the hybrid object detection unit 70 specifies the type of the object detected in the monocular-vision area by pattern matching. In addition, the hybrid object detection unit 70 estimates the distance of the object in the monocular-vision image based on, for example, a grounding position of the object in the monocular-vision image and position information by the stereo parallax image on the same horizontal line as the grounding position. Therefore, in a case where a pixel shift occurs in which the position of the image is shifted in the vertical direction due to refraction of the light transmitted through the windshield WS, a distance measurement error in the monocular-vision area occurs.

Figure 3A:
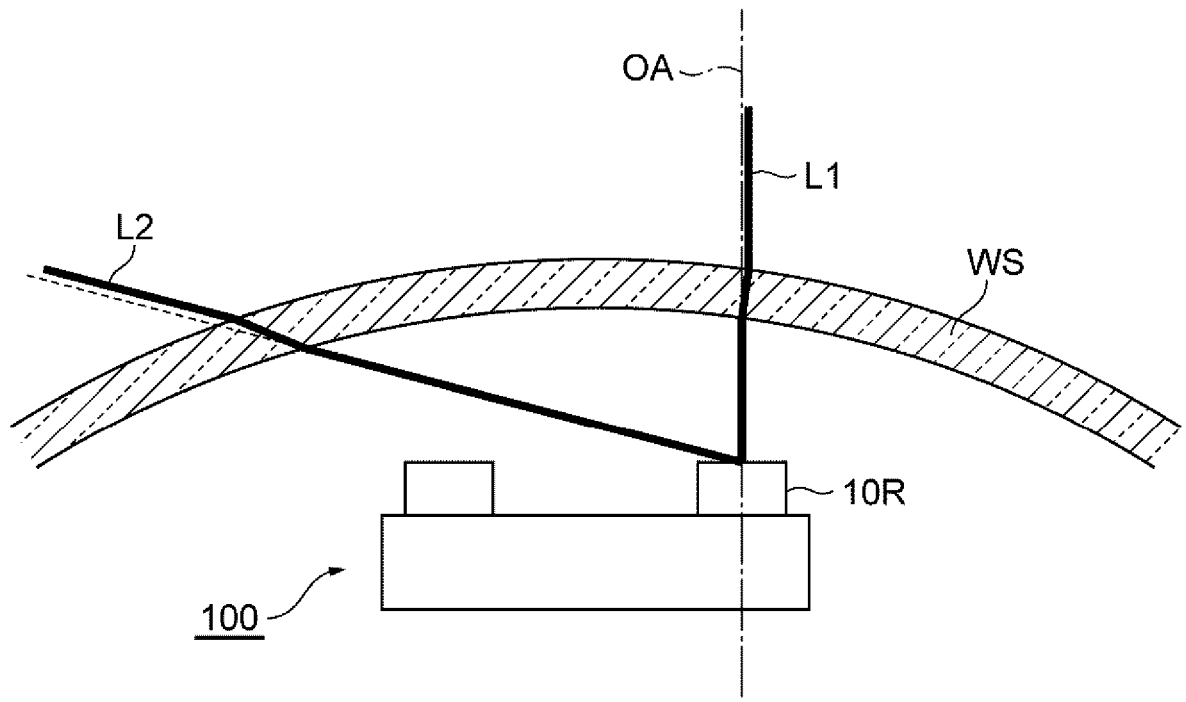
FIG. 3A is a schematic horizontal cross-sectional view for refraction of light explaining transmitted through a windshield.
Figure 3B:
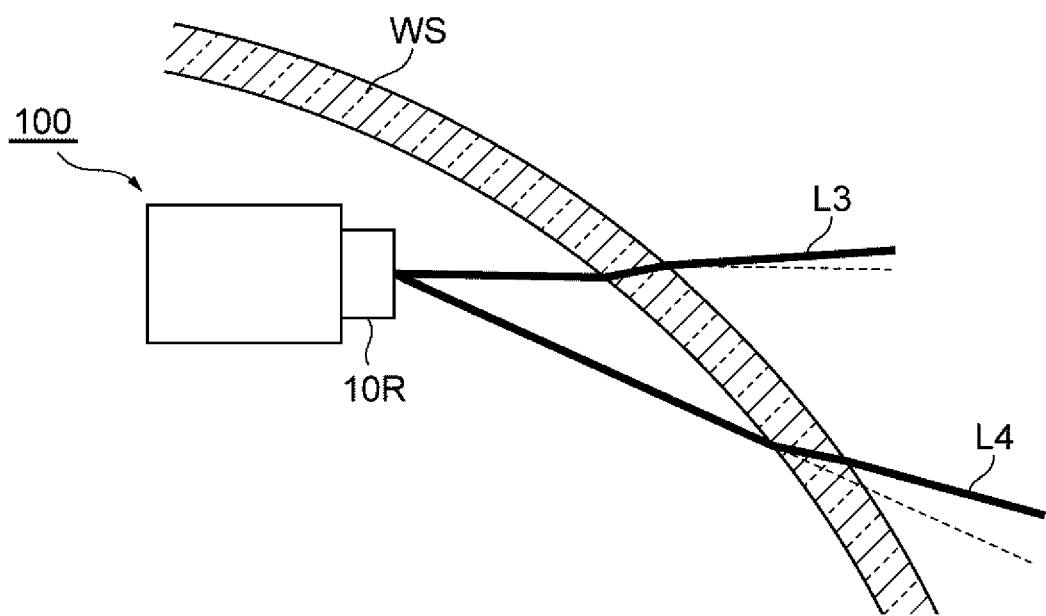
FIG. 3B is a schematic vertical cross-sectional view for explaining refraction of light transmitted through the windshield.
Figure 4:
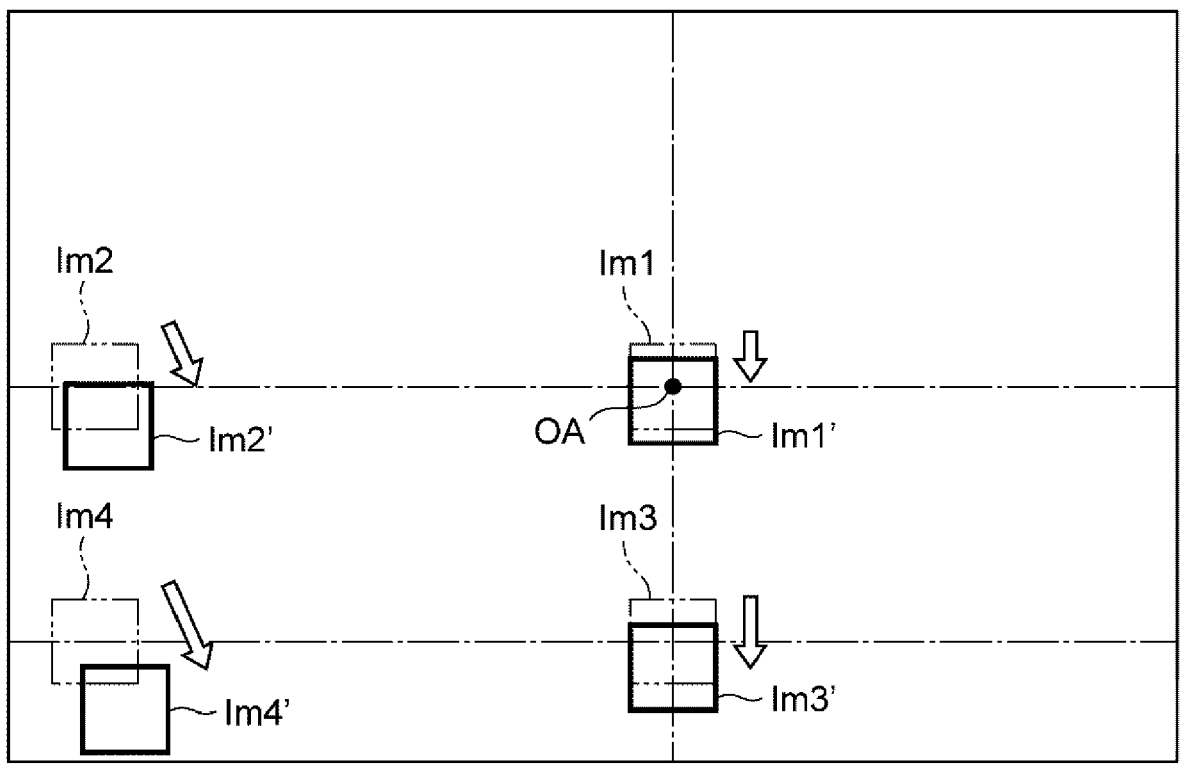
FIG. 4 is a schematic diagram illustrating displacement of an image of an image sensor due to refraction of light in FIGS. 3A and 3B.

FIGS. 3A and 3B each are a schematic horizontal cross-sectional view and a vertical cross-sectional view for explaining refraction of light that passes through the windshield WS and is injected into the right camera 10R of the stereo camera device 100, respectively. FIG. 4 is a schematic diagram illustrating displacement of an image on the image sensor of the right camera 10R due to refraction of light transmitted through the windshield WS. Note that, in FIG. 4, images of object Im1 to Im4 captured without through the windshield WS are indicated by a two-dot chain line, and images of object Im1' to Im4' captured through the windshield WS are indicated by a solid line.

As illustrated in FIGS. 3A and 3B, light beams L1 to L4 injected on the windshield WS are refracted according to Snell's law. Here, if the injection surface and the extraction surface of the windshield WS through which the light beams L1 to L4 transmit are parallel, the injection light and the extraction light of the light beams L1 to L4 are parallel. Therefore, as illustrated in FIG. 3A, the angle of the light beam L1 injected on the front portion of the windshield WS hardly changes even after the light beam L1 passes through the windshield WS. Therefore, as illustrated in FIG. 4, in the horizontal direction, the images of object Im1' and Im3' captured through the windshield WS in the vicinity of an optical axis OA of the camera 10 have small displacement in the horizontal direction with respect to the images of object Im1 and Im3 captured without through the windshield WS.

However, as illustrated in FIG. 3A, for the light beam L2 in which the inclination angle with respect to the optical axis direction of the camera 10 is large, and which is injected on the windshield WS from the side of the vehicle V, and the change in the angle after passing through the windshield WS becomes relatively large. As a result, as illustrated in FIG. 4, in the horizontal direction, for the images of object Im2' d Im4' captured through the windshield WS at the position of the wide angle of view separated from the optical axis OA of the camera 10, the displacement in the horizontal direction with respect to the images of object Im2 and Im4 captured without through the windshield WS becomes relatively large.

Further, as illustrated in FIG. 3B, the windshield WS is inclined with respect to the vertical direction so as to be positioned on the rear side toward the upper side, for example. Therefore, the light beams L3 and L4 injected on the camera 10 through the windshield WS are injected to be inclined with respect to the incident surface of the windshield WS. As a result, in the vertical direction, the light beam L3 transmitted through the windshield WS at the position in the vicinity of the optical axis OA of the camera 10 and the light beam L4 passing through the windshield WS at the position of the wide angle of view separated from the optical axis OS of the camera 10 both have a relatively large change in angle after passing through the windshield WS. On the other hand, the change in the light beam angle in the vertical direction by the windshield WS in the center region in the horizontal direction has small horizontal view angle dependency.

In this manner, the position of the image of the object formed on the image sensor by the lens of the camera 10 without through the windshield WS is changed by imaging through the windshield WS. Therefore, as illustrated in FIG. 4, in the vertical direction, the displacement of the images of object Im1' to Im4' captured through the windshield WS from the position of the images of object Im1 to Im4 captured without through the windshield WS to the lower side in the vertical direction becomes relatively large. The displacement in the vertical direction from the position of the original images Im1 to Im4 of this object to the position of the images Im1' to Im4' is a pixel shift. The amount of this pixel shift varies depending on the position on the image sensor, and thus appears as distortion of the image.

As described above, the stereo camera device 100 of the present embodiment estimates the distance to the object using the grounding position of the object in the monocular-vision area Am. Therefore, the pixel shift in the vertical direction as described above causes a distance measurement error in the monocular-vision area Am. The amount of the pixel shift depends on the shape or inclination of the windshield WS. In particular, when the curvature of the windshield WS is large and the inclination of the windshield WS with respect to the vertical direction is large, the pixel shift becomes large. The camera calibration method and the stereo camera device 100 of the present embodiment calibrate the camera 10 so as to correct such a pixel shift.

Figure 5:
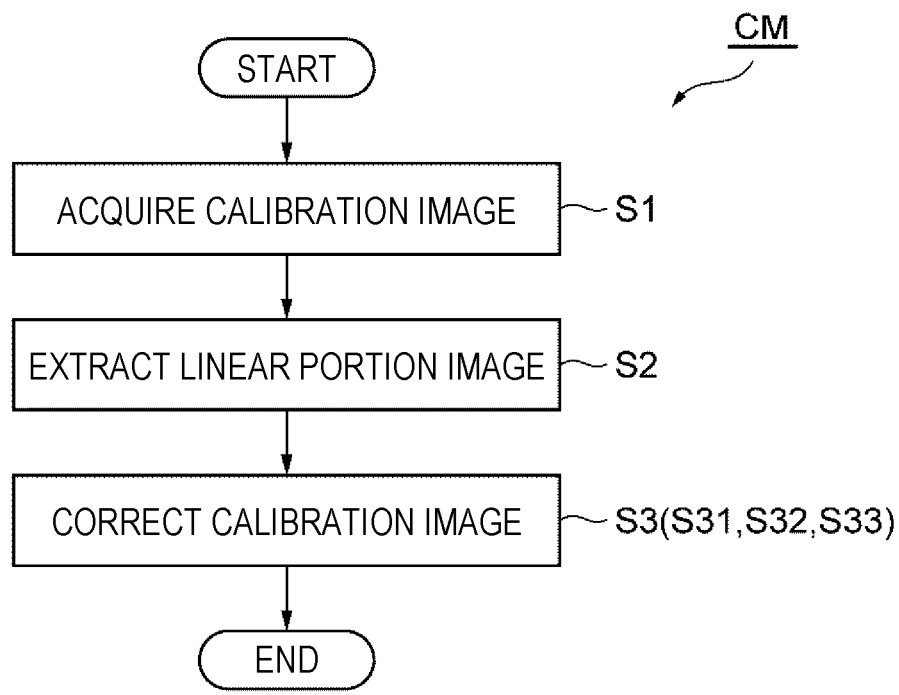
FIG. 5 is a flowchart illustrating an embodiment of the camera calibration method according to the present disclosure.

FIG. 5 is a flowchart illustrating an embodiment of a camera calibration method according to the present disclosure. A camera calibration method CM of the present embodiment is a method of calibrating the camera 10 that captures an image through the windshield WS. The camera calibration method CM includes a step S1 of acquiring a calibration image, a step S2 of extracting a linear portion image, and a step S3 of correcting distortion of the calibration image. The camera calibration method CM can be implemented by, for example, the stereo camera device 100.

In the step S1, for example, the stereo camera device 100 captures an image of a calibration object having a linear portion extending in one direction intersecting the optical axis OA of the camera 10 through the windshield WS by the left and right cameras 10L and 10R to acquire a calibration image. Note that the camera calibration method CM of the present embodiment can also be applied to, for example, a monocular camera.

Figure 6:
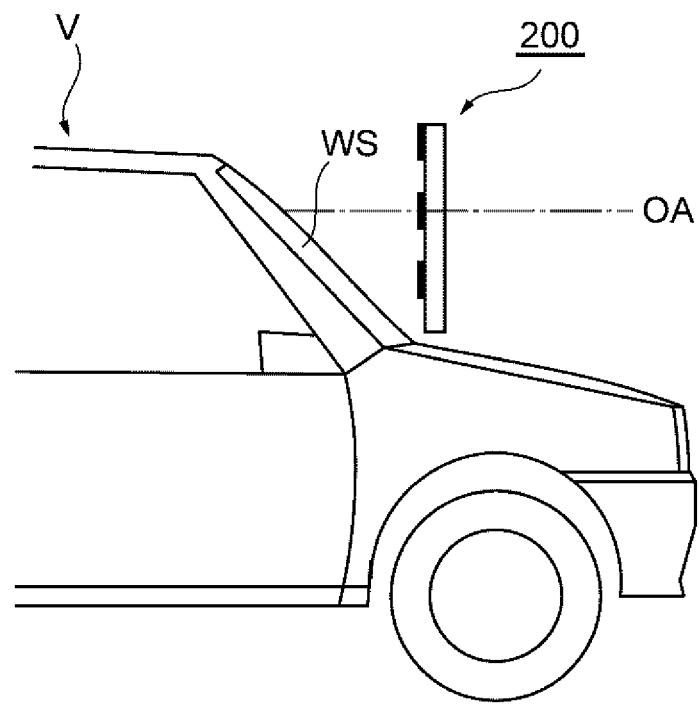
FIG. 6 is a diagram illustrating an example of a calibration object in a step of acquiring a calibration image of FIG. 5.
Figure 7A:
FIG. 7A is a front view of a calibration chart as the calibration object illustrated in FIG. 6.
Figure 7B:
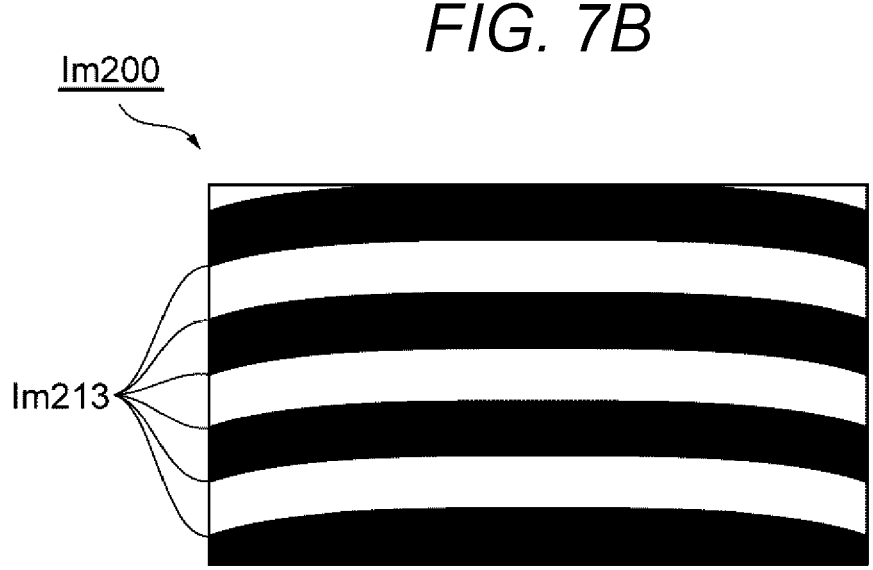
FIG. 7B is an image diagram of a camera that captures the calibration chart illustrated in FIG. 7A.

FIG. 6 is a diagram illustrating an example of the calibration object in the step S1 of acquiring the calibration image. FIG. 7A is a front view of the calibration object illustrated in FIG. 6. FIG. 7B is an image diagram of the camera 10 before calibration in which the calibration object illustrated in FIG. 7A is imaged through the windshield WS. In FIG. 7B, the pixel shift is illustrated in an enlarged manner compared to the actual pixel shift.

In the examples illustrated in FIGS. 6, 7A, and 7B, the calibration object imaged through the windshield WS by the camera 10 of the stereo camera device 100 is, for example, a calibration chart 200 having a stripe calibration pattern 210. Such the calibration chart 200 can be used, for example, in a case where the camera calibration method CM of the present embodiment is implemented in a manufacturing factory of the vehicle V, a maintenance factory of the vehicle V, a manufacturing factory of the stereo camera device 100, or the like.

The stripe calibration pattern 210 of the calibration chart 200 is, for example, a pattern in which band-shaped dark color portions 211 and band-shaped light color portions 212 extending along the horizontal direction are alternately arranged in the vertical direction. The dark color portion 211 is, for example, black, and the light color portion 212 is, for example, white. Note that the colors of the dark color portion 211 and the light color portion 212 are not particularly limited as long as edge detection described later is possible.

In the step S1 of acquiring the calibration image, the calibration chart 200 as the calibration object imaged by the camera 10 through the windshield WS includes a linear portion 213 extending in one direction intersecting the optical axis OA of the camera 10. The linear portion 213 is, for example, a boundary line between the dark color portion 211 and the light color portion 212 of the stripe calibration pattern 210 drawn in the calibration chart 200, and extends in the horizontal direction orthogonal to the optical axis OA of the camera 10.

Further, in the step S1 of acquiring the calibration image, for example, the calibration chart 200 is imaged such that a calibration image Im200 which is an image of the calibration chart 200 includes a linear portion image Im213 which is an image of the linear portion 213 from one end to the other end in one direction intersecting the optical axis OA of the camera 10. In the present embodiment, for example, in the step S1, the calibration chart 200 is imaged such that the calibration image Im200 includes the linear portion image Im213 from one end to the other end in the horizontal direction orthogonal to the optical axis OA of the camera 10.

As illustrated in FIG. 7B, in the calibration image Im200, the pixel shift to the lower side in the vertical direction increases as the position of the wide angle of view in the horizontal direction is farther from the central portion where the optical axis OA of the camera 10 is located in the horizontal direction. This is because the injection angle of the light with respect to the windshield WS increases as a position become closer to the wide angle of view position in the horizontal direction.

Further, in the step S1 of acquiring the calibration image, for example, as illustrated in FIG. 6, the calibration chart 200 as the calibration object arranged at a position in front of the windshield WS in the optical axis OA direction of the camera 10 and above the vehicle V in the vertical direction is imaged. More specifically, for example, the calibration chart 200 is installed on the vehicle body of the vehicle V such as the hood in front of the windshield WS of the vehicle V. That is, for example, the calibration chart 200 is arranged between the front end of the vehicle V and the windshield WS in the front-rear direction of the vehicle V.

Next, as illustrated in FIG. 5, the stereo camera device 100 performs the step S2 of extracting the linear portion image. In the step S2, the stereo camera device 100 extracts a linear portion image Im213, which is an image of the linear portion 213, from the calibration image Im200, for example. As described above, in a case where the calibration chart 200 is imaged by the camera 10 in a state where the distance between the calibration chart 200 and the stereo camera device 100 is small, the resolution of the camera 10 decreases, and the edge which is the boundary between the dark color portion 211 and the light color portion 212 of the calibration pattern 210 tends to be unclear.

On the other hand, the stereo camera device 100 of the present embodiment detects the edges of the dark color portion 211 and the light color portion 212 by, for example, the method described below. First, a signal intensity change in a change from the dark color portion 211 to the light color portion 212 or a change from the light color portion 212 to the dark color portion 211 of the calibration pattern 210 is detected. Next, the position in the vertical direction of the pixel in which the signal having the intensity of the half value of the intensity change of the signal is detected is specified, and the edge which is the boundary between the dark color portion 211 and the light color portion 212 is detected based on the position.

Figure 8:
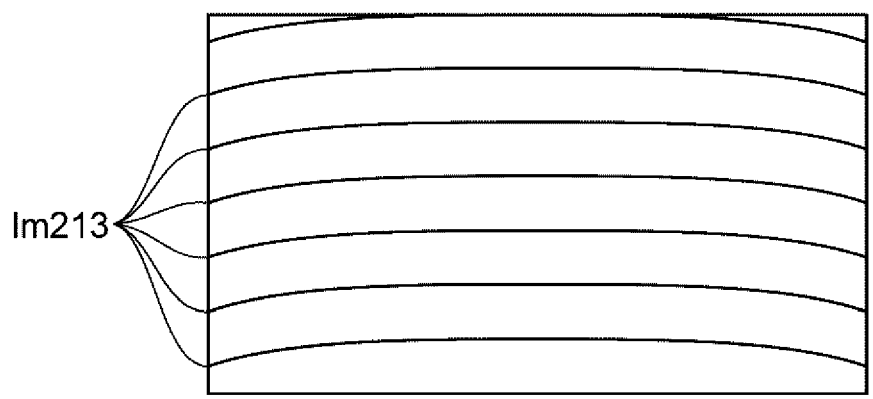
FIG. 8 is an image diagram illustrating an example of an extraction result of a step of extracting a linear portion image of FIG. 5.

FIG. 8 is a diagram illustrating an example of the linear portion image Im213 extracted in the step S2. For example, as described above, the stereo camera device 100 detects an edge which is a boundary between the dark color portion 211 and the light color portion 212, and extracts the linear portion image Im213 corresponding to the linear portion 213 as illustrated in FIG. 8.

Next, as illustrated in FIG. 5, the stereo camera device 100 executes the step S3 of correcting the calibration image. In the step S3, the stereo camera device 100 corrects distortion of the calibration image Im200 based on the virtual linear portion image assumed in a case where the linear portion 213 is imaged without through the windshield WS by the camera 10 and the linear portion image Im213 acquired in the step S1.

The Step S3 of correcting the calibration image includes, for example, a step S31 of creating a correction table of pixel shift, a step S32 of creating a correction table of lens pupil shift, and a step S33 of correcting distortion of the calibration image.

In the step S31 of creating the correction table of pixel shift, for example, the stereo camera device 100 first corrects the inclination of the linear portion image Im213, then calculates the pixel shift amount of the linear portion image Im213 in the vertical direction, and creates the correction table of pixel shift.

Figure 9A:
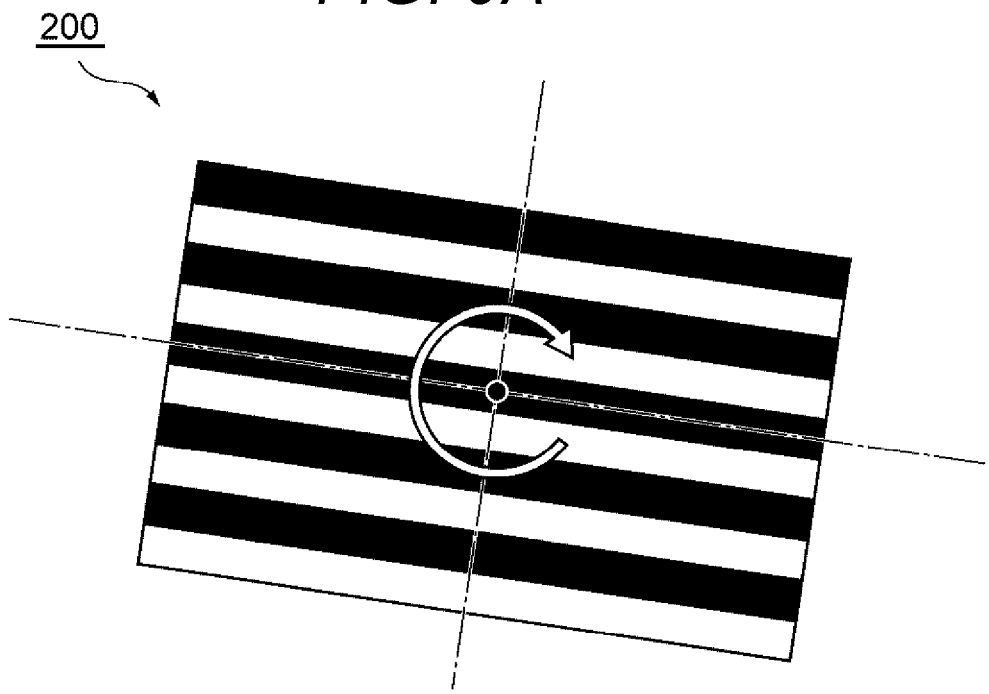
FIG. 9A is a diagram illustrating an example of inclination when a calibration chart is installed.
Figure 9B:
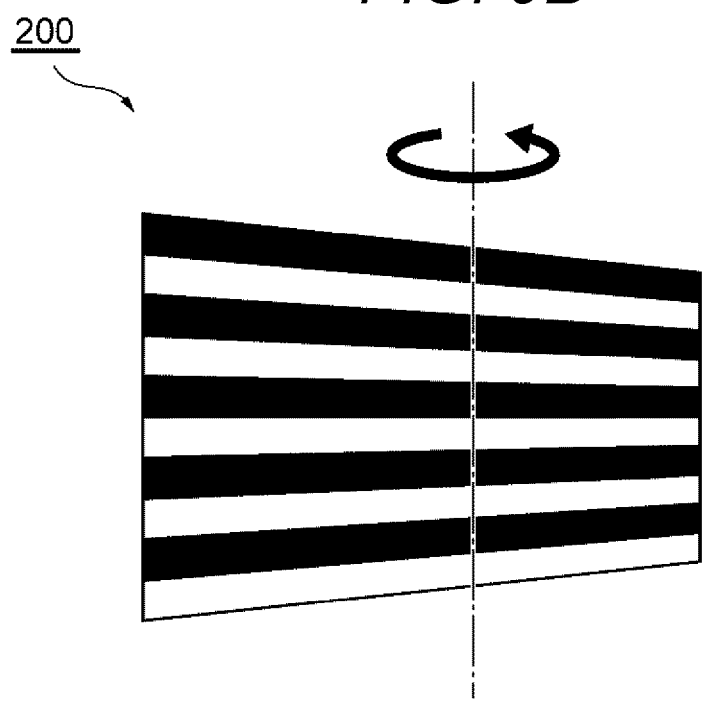
FIG. 9B is a diagram illustrating an example of inclination when the calibration chart is installed.

FIGS. 9A and 9B are diagrams illustrating examples of inclinations when the calibration chart 200 is installed. For example, the calibration chart 200 is installed such that the linear portion 213 which is the boundary between the dark color portion 211 and the light color portion 212 of the stripe calibration pattern 210 is horizontal, and a display surface on which the calibration pattern 210 is displayed is perpendicular to the optical axis of the camera 10.

However, due to the installation r of the calibration chart 200, inclination due to rotation about the normal line of the display surface of the calibration chart 200 illustrated in FIG. 9A or inclination due to rotation about the center line in the vertical direction of the calibration chart 200 illustrated in FIG. 9B may occur. Due to such an inclination of the calibration chart 200, an inclination may occur in the linear portion image Im213 extracted in the previous step S2.

Figure 10:
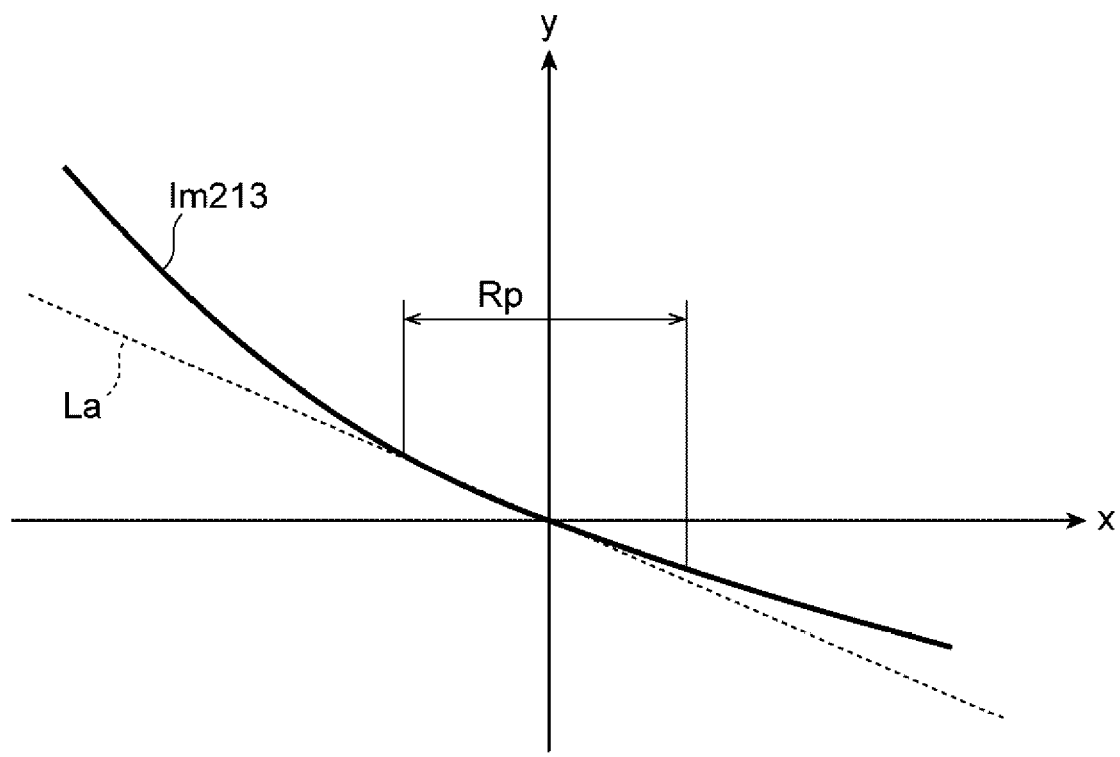
FIG. 10 is a graph illustrating the inclination of the linear portion image due to the inclination when the calibration chart is installed.

FIG. 10 is a graph illustrating the inclination of the linear portion image Im213 extracted in the previous step S2. In FIG. 10, the x axis represents the pixel position in the horizontal direction, and the y axis represents the displacement amount of the pixel in the vertical direction. In FIG. 10, one linear portion image Im213 among the plurality of linear portion images Im213 illustrated in FIG. 8 is vertically inverted and enlarged.

As illustrated in FIG. 3A, in the vicinity of a position centered on the optical axis OA of the camera 10, that is, a position where the horizontal view angle is 0°, the influence of refraction of light by the windshield WS is small. Therefore, in the step of correcting the inclination of the linear portion image Im213, an approximate line La of the linear portion image Im213 in a pixel range Rp in the vicinity of the position where the horizontal view angle is 0° is obtained, the pixel shift amount in the vertical direction for making the inclination of the approximate line La zero is obtained, and the inclination of the linear portion image Im213 is corrected. The pixel range Rp can be set to, for example, the number of pixels having a horizontal view angle of +10° to +20°.

For example, the stereo camera device 100 performs correction of the inclination of the linear portion image Im213 as described above for all the linear portion images Im213 extracted in the previous step S2. As a result, even if the display surface of the calibration chart 200 is inclined as illustrated in FIGS. 9A and 9B, the plurality of linear portion images Im213 extracted in the previous step S2 can be corrected to a state without inclination.

Next, the stereo camera device 100 creates a correction table of pixel shift based on, for example, the pixel shift amount in the vertical direction of the pixel of each of the linear portion images Im213 after the inclination correction arranged in the vertical direction. Here, the pixel shift amount in the vertical direction of the pixel of each of the linear portion images Im213 is, for example, a pixel shift amount in the vertical direction with respect to the pixel of the virtual linear portion image which is an image of the linear portion 213 captured without through the windshield WS. In the correction table of pixel shift, for example, the horizontal pixel, the vertical pixel, and the pixel shift amount are set to the X axis, the Y axis, and the Z axis, respectively. Next, the stereo camera device 100 performs, for example, the step S32 of creating a correction table of pupil shift.

Figure 11:
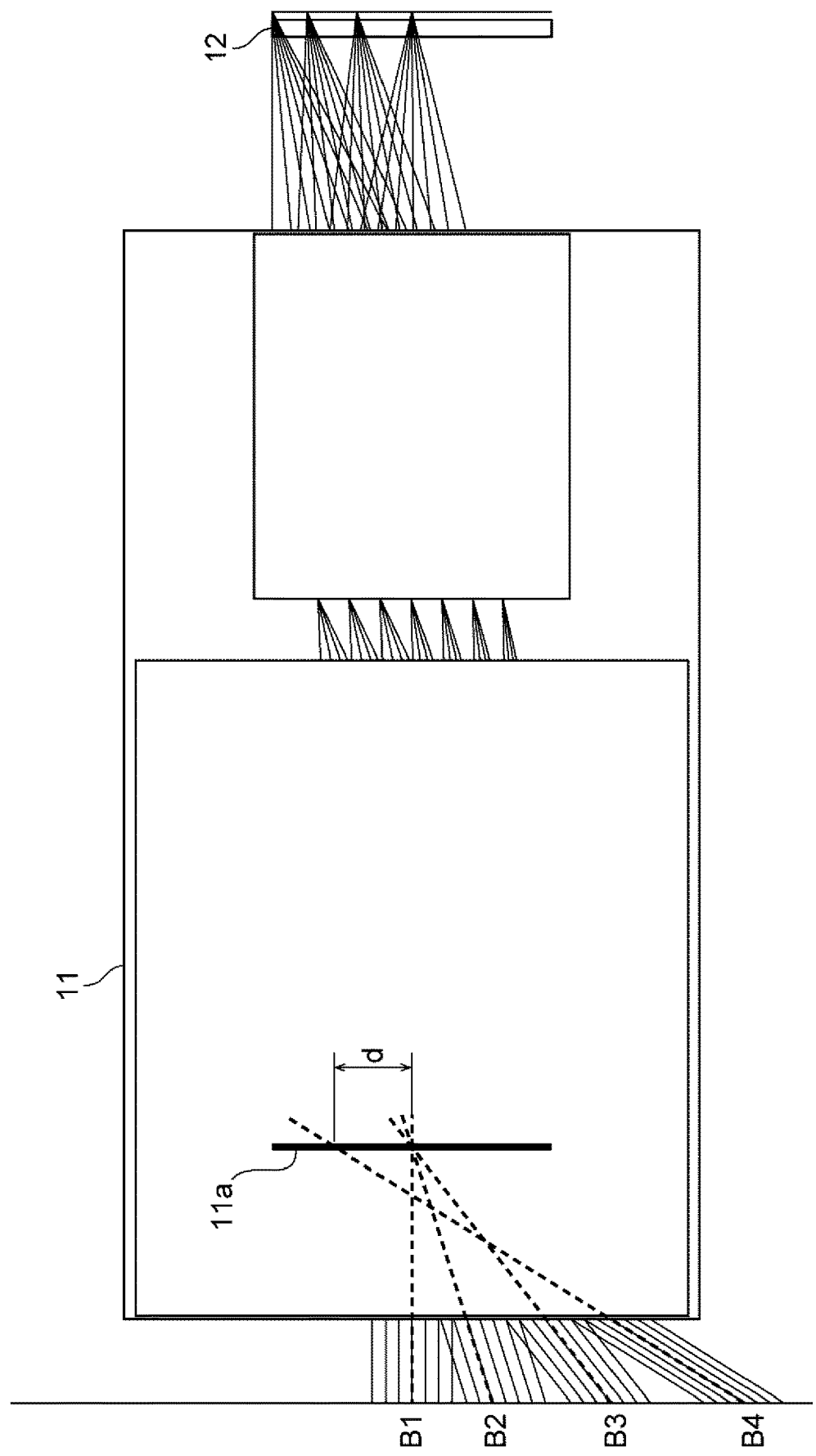
FIG. 11 is a schematic vertical cross-sectional view illustrating pupil shift of a wide-angle lens.

FIG. 11 is a schematic vertical cross-sectional view illustrating pupil shift of the wide-angle lens. In the wide-angle lens, the position of the pupil changes depending on the angle of view. As illustrated in FIG. 11, light beams B1 to B4 injected on a lens 11 of the camera 10 form an image on an imaging sensor 12 of camera 10. In a plane 11a having an origin at an intersection of an extended lines of the light beams B1 and B2 injected on the lens 11, the light beam B4 having the wide angle of view intersects the plane 11a at a position separated from the origin by a distance d. In the present embodiment, this distance d is referred to as a pupil shift amount. The pupil shift amount changes depending on the angle of view of the injection light on the lens 11, the design of the lens 11, and the like.

Figure 12:
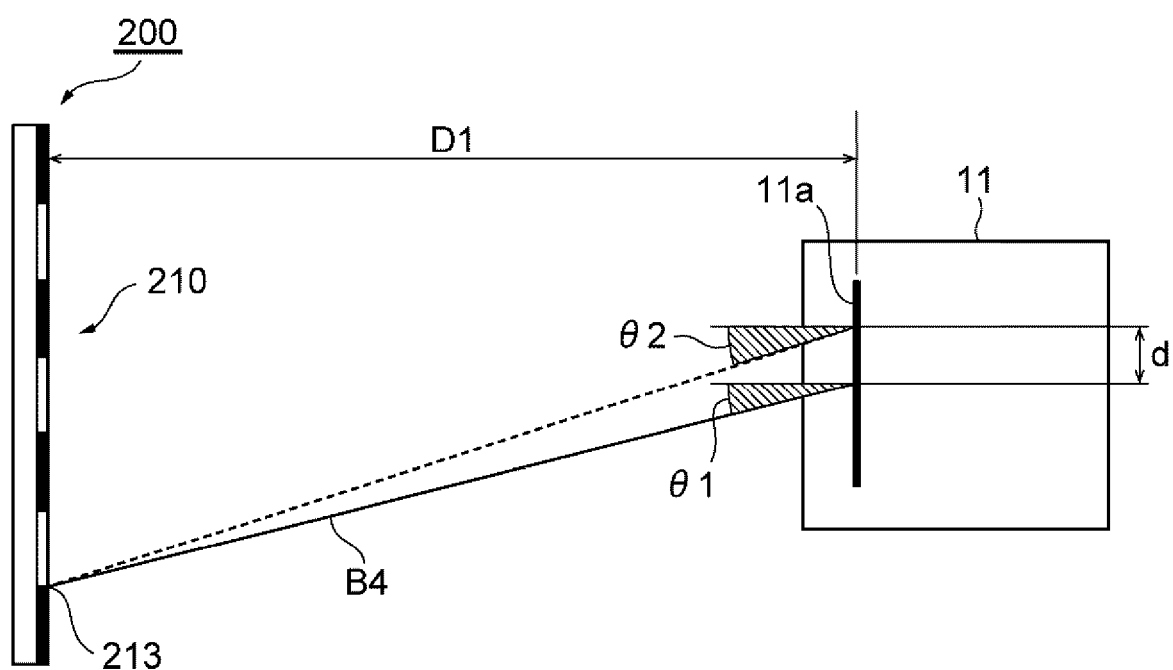
FIG. 12 is a schematic vertical cross-sectional view for explaining the influence of pupil shift of the lens of the camera.

FIG. 12 is a schematic vertical cross-sectional view for explaining the influence of pupil shift of the lens 11 of the camera 10. In a case where the linear portion 213 is detected from the calibration pattern 210 of the calibration chart 200 separated from the plane 11a by the distance D1 by the camera 10, the vertical view angle of the light beam B4 injected at the vertical view angle having the wide angle of view becomes an angle θ1 unless the pupil shift of the lens 11 is taken into consideration. However, in a case where the lens 11 is a wide-angle lens, pupil shift occurs. Therefore, it is necessary to detect the vertical view angle of the light beam B4 as an angle θ2 in consideration of the pupil shift.

In the step S32 of creating the pupil shift correction table, the stereo camera device 100 uses, for example, the design value of the lens 11 of the camera 10 recorded in advance in the memory. More specifically, for example, the stereo camera device 100 obtains the angle θ2 from the distance D1 and the pupil shift amount, calculates the pixel position on the image sensor based on the projection of the lens, and obtains the pixel shift amount with respect to the pixel position on the image sensor in a case where the pupil shift is not considered for the calculated pixel position.

For example, the stereo camera device 100 creates a correction table of pixel shift amount due to pupil shift by performing the above processing in all directions (view angles) of the vertical direction and the horizontal direction. The X axis, the Y axis, and the Z axis of the correction table are a horizontal pixel, a vertical pixel, and a pixel shift amount, respectively.

Note that the influence of the pupil shift of the lens can be ignored in a case where the distance D1 is sufficiently large. However, as illustrated in FIG. 6, in a case where the calibration chart 200 as the calibration object is arranged at a position close to the stereo camera device 100, the influence of the pupil shift cannot be ignored. Therefore, the camera calibration method CM and the stereo camera device 100 of the present embodiment perform step S32 of creating a correction table of pupil shift of the lens 11 of the camera 10 using the design value of the lens 11.

Next, the stereo camera device 100 performs step S33 of correcting the distortion of the calibration image. In step S33, the stereo camera device 100 derives a correction derivative for correcting the distortion of the calibration image Im200 acquired in step S1 based on the correction table of pixel shift and the correction table of pupil shift created in previous steps S31 and S32.

More specifically, the stereo camera device 100 creates a correction table of distortion by, for example, adding or subtracting the pixel shift amount of the correction table of pixel shift and the pixel shift amount of the correction table of pupil shift. Further, the stereo camera device 100 calculates, for example, a correction derivative for correcting the pixel shift amount for each pixel in the created correction table of distortion. Then, the stereo camera device 100 applies the calculated correction derivative to the image captured by the camera 10 to calibrate the camera 10.

Hereinafter, functions of the camera calibration method CM and the stereo camera device 100 of the present embodiment will be described.

As described above, the camera calibration method CM of the present embodiment is a calibration method of the camera 10 that captures an image through the windshield WS. The camera calibration method CM includes imaging, by the camera 10, a calibration object having the linear portion 213 extending in one direction intersecting the optical axis OA of the camera 10 through the windshield WS to acquire a calibration image (step S1). Further, the camera calibration method CM includes extracting a linear portion image Im213 corresponding to the linear portion 213 from the calibration image (step S2). Furthermore, the camera calibration method CM includes correcting distortion of the calibration image based on the linear portion image Im213 and the virtual linear portion image assumed in a case where the linear portion 213 is imaged without through the windshield WS by the camera 10 (step S3).

According to the camera calibration method CM of the present embodiment, for example, the linear portion image Im213 of the linear portion 213 extending in one direction intersecting the optical axis OA of the camera 10 can be extracted from the calibration pattern 210 of the calibration object such as the calibration chart 200. The linear portion image Im213 includes the shift of the pixel in the vertical direction due to the refraction of the light transmitted through the windshield WS, which is remarkable in the camera 10 with the wide angle of view, that is, the pixel shift. Furthermore, by imaging the calibration object such as the calibration chart 200 including the linear portion 213 by the camera 10, the virtual linear portion image to be compared with the linear portion image Im213 imaged through the windshield WS can be easily generated as, for example, a straight linear image. Therefore, according to the camera calibration method CM of the present embodiment, it is possible to correct the pixel shift due to the influence of the windshield WS and easily calibrate the camera 10 having a wide angle of view that captures an image through the windshield WS.

Furthermore, in the camera calibration method CM of the present embodiment, acquiring the calibration image (step S1) includes imaging the calibration object such as the calibration chart 200 such that the calibration image Im200 includes the linear portion image Im213 from one end to the other end in one direction intersecting the optical axis OA of the camera 10. With such a method, according to the camera calibration method CM of the present embodiment, it is possible to more reliably correct the pixel shift of the image due to the light transmitted through both ends in the horizontal direction and both ends in the vertical direction of the windshield WS in which the pixel shift becomes remarkable in the camera 10 having the wide angle of view.

Furthermore, in the camera calibration method CM of the present embodiment, correcting the distortion of the calibration image S3) includes correcting (step the inclination of the linear portion image Im213 based on the inclination of the linear portion image Im213 with respect to the horizontal direction or the vertical direction in a predetermined range (pixel range Rp) of the calibration image (step S31). By such a method, according to the camera calibration method CM of the present embodiment, it is possible to correct the inclination of the linear portion image Im213 due to the installation error of the calibration chart 200 as the calibration object as illustrated in FIGS. 9A and 9B, and to more accurately correct the pixel shift.

Furthermore, in the camera calibration method CM of the present embodiment, acquiring the calibration image (step S1) includes imaging the calibration chart 200 as the calibration object arranged at the position in front of the windshield WS in the optical axis OA direction of the camera 10 and above the vehicle V in the vertical direction.

With such a method, according to the camera calibration method CM of the present embodiment, it is possible to suppress an increase in the length of the calibration chart 200 used for calibration of the camera 10 having the wide angle of view and to facilitate installation of the calibration chart 200 in a manufacturing factory or a maintenance factory. Hereinafter, this effect will be described in more detail with reference to FIG. 13.

Figure 13:
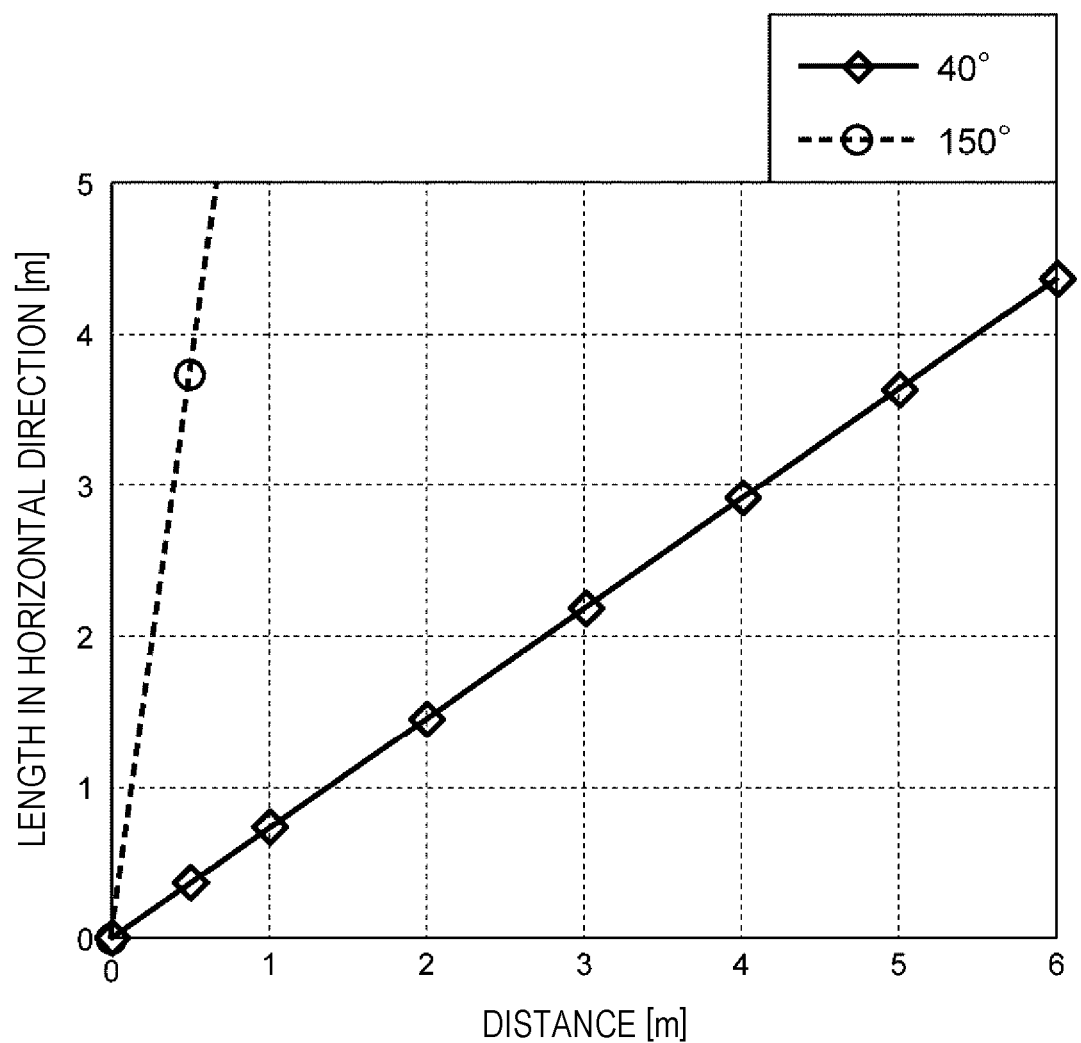
FIG. 13 is a graph illustrating a relationship between a horizontal length of the calibration chart and an installation distance.

FIG. 13 is a graph comparing the relationship between the horizontal length of the calibration chart 200 required for calibration of the camera 10 and the distance from the camera 10 to the calibration chart 200 between a case where the horizontal view angle of the camera 10 is 40° and a case where the horizontal view angle is 150°. In the stereo camera device 100 of the present embodiment, the horizontal view angle of the camera 10 is widened to, for example, about 110° to 150°.

For example, in a case of a conventional camera having a horizontal view angle of 40°, the horizontal length required for the calibration chart installed at a position 5 m away from the camera is about 3.6 m. However, for example, in a case where the horizontal view angle of the camera 10 of the stereo camera device 100 of the present embodiment is 150° and the calibration chart 200 is installed at a position 5 m away from the camera, the length of the calibration chart 200 in the horizontal direction required for calibration of the camera 10 becomes very large. Therefore, it may be difficult to install the calibration chart 200 in a manufacturing factory or a maintenance factory.

However, as illustrated in FIG. 6, in the camera calibration method CM of the present embodiment, in the step S1 of acquiring the calibration image, for example, the calibration chart 200 as the calibration object arranged at the position in front of the windshield WS in the optical axis OA direction of the camera 10 and above the vehicle V in the vertical direction is imaged. As a result, the distance between the camera 10 and the calibration chart 200 can be reduced, and for example, the calibration chart 200 can be installed at a distance within 1 m from the camera 10.

As a result, for example, the horizontal length of the calibration chart 200 required for calibration of the camera 10 having the wide angle of view with the horizontal view angle of 150° can be set to about the same length as the length of the calibration chart required for installation 5 m ahead of the camera with the horizontal view angle of 40°. Therefore, the calibration chart 200 used for calibration of the camera 10 having a wide angle of view can be easily installed in a manufacturing factory or a maintenance factory.

Furthermore, in the camera calibration method CM of the present embodiment, correcting distortion of the calibration image (step S3) includes, for example, correcting distortion due to lens characteristics of the camera 10, such as pupil shift of the lens 11 (step S32). With such a method, according to the camera calibration method CM of the present embodiment, it is possible to more accurately correct the pixel shift due to the influence of the windshield WS.

In addition, the stereo camera device 100 of the present embodiment includes the left and right cameras 10L and 10R that capture images through the windshield WS, and includes the image processing unit 20, the stereo parallax image generation unit 30, a road surface cross-sectional shape estimation unit 40, the stereo-vision object detection unit 50, the left and right monocular image generation unit 60, or the hybrid object detection unit 70 that functions as the following acquisition unit, extraction unit, and correction unit. The acquisition unit acquires the calibration image Im200 by imaging the calibration object having the linear portion 213 extending in one direction intersecting the optical axis OA of the camera 10 through the windshield WS by the camera 10. The extraction unit extracts the linear portion image Im213 corresponding to the linear portion 213 from the linear portion image Im213. The correction unit corrects distortion of the calibration image Im200 based on the linear portion image Im213 and the virtual linear portion image assumed in a case where the linear portion 213 is imaged without through the windshield WS by the camera 10.

With such a configuration, according to the stereo camera device 100 of the present embodiment, the above-described camera calibration method CM can be performed, and the same effects as those of the camera calibration method CM can be obtained.

As described above, according to the present embodiment, it is possible to provide the camera calibration method CM and the stereo camera device 100 capable of easily calibrating the wide-angle camera 10 that captures an image through the windshield WS.

Second Embodiment

Figure 14:
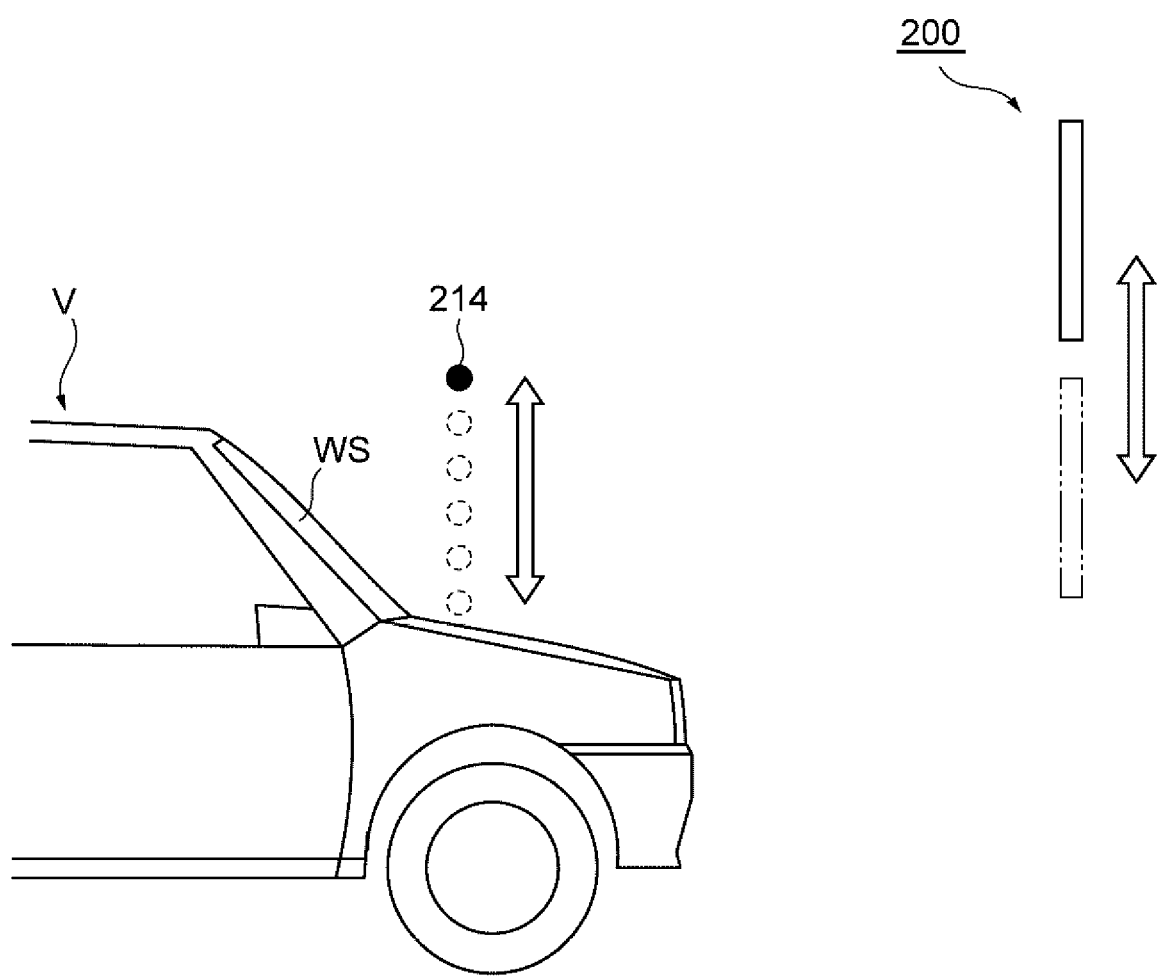
FIG. 14 is a schematic side view illustrating a second embodiment of the camera calibration method of the present disclosure.

Hereinafter, a second embodiment of a camera calibration method according to the present disclosure will be described using FIG. 14 with reference to FIGS. 1 to 5. FIG. 14 is a schematic side view illustrating the second embodiment of the camera calibration method of the present disclosure.

The camera calibration method CM of the present embodiment is different from the camera calibration method CM of the first embodiment in that the calibration object includes a wire or a bar 214 and that the step S1 of acquiring the calibration image includes relatively moving the camera 10 and the wire or the bar 214 as the calibration object. Since the other points of the camera calibration method CM of the present embodiment are similar to those of the camera calibration method CM of the above-described embodiment, the same reference numerals are given to similar parts, and the description thereof will be omitted.

The camera calibration method CM of the present embodiment can be performed, for example, on a manufacturing line of a vehicle V. For example, various components including the stereo camera device 100 are attached to the vehicle V while moving in the right direction in FIG. 14. When the attachment of the stereo camera device 100 to the vehicle V is completed, the camera calibration method CM of the present embodiment is performed. In the camera calibration method CM of the present embodiment, the wire or bar 214 and the calibration chart 200 for the stereo-vision area As of the left and right cameras 10L and 10R are used as the calibration objects in the step S1 of acquiring the calibration image.

For example, the wire or the bar 214 is arranged above the manufacturing line of the vehicle V with both ends supported so as to be parallel to the horizontal direction, and is provided so as to be vertically movable by a lifting mechanism (not illustrated). The calibration chart 200 has, for example, an arbitrary calibration pattern generally used in calibration of a stereo camera, and is provided so as to be vertically movable by a lifting mechanism (not illustrated) similarly to the wire or the bar 214.

The wire or bar 214 extends, for example, in the horizontal direction intersecting the optical axis OA of the camera 10, thereby forming a linear portion in itself. In addition, the wire or the bar 214 has, for example, a contour line or an outer shape extending in one direction intersecting the optical axis OA of the camera 10 as a linear portion. Note that it is considered that the central portion of the wire or bar 214 is deflected downward from both end portions due to gravity, but since such deflection is minute, the wire or bar can be used as the calibration object having a linear portion.

In the camera calibration method CM of the present embodiment, when the vehicle V moves on the manufacturing line to the position below the wire or the bar 214, the lifting mechanism operates to lower the wire or the bar 214 in front of the stereo camera device 100. In step S1 of acquiring the calibration image, the stereo camera device 100 continuously images the descending wire or bar 214 a plurality of times by the camera 10. The stereo camera device 100 combines a plurality of images of the wire or the bar 214 to acquire a calibration image.

Thereafter, the stereo camera device 100 performs the step S2 of extracting the linear portion image corresponding to the linear portion from the calibration image, similarly to the first embodiment described above. As a result, a linear portion image similar to the linear portion image Im213 illustrated in FIG. 8 of the first embodiment described above is extracted. Thereafter, similarly to the first embodiment described above, the stereo camera device 100 performs the step S3 of correcting distortion of the calibration image based on the virtual linear portion image assumed in a case where the linear portion of the wire or the bar 214 is imaged by the camera 10 without through the windshield WS and the linear portion image extracted in the step S2.

As a result, the camera calibration method CM and the stereo camera device 100 of the present embodiment can achieve effects similar to those of the camera calibration method CM and the stereo camera device 100 of the first embodiment described above. Further, when the wire or the bar 214 is completely lowered to a predetermined position, the calibration chart 200 is lowered to a predetermined position in front of the calibration chart 200 by the lifting device.

The calibration chart 200 of the present embodiment is imaged to calibrate the camera 10 using the image of the stereo-vision area As of the camera 10. Therefore, the horizontal length of the calibration chart 200 of the present embodiment is substantially the same as the horizontal length of the calibration chart used for calibration of a normal stereo camera that does not use a wide-angle camera. The stereo camera device 100 images the calibration chart 200 through the windshield WS by the left and right cameras 10L and 10R, thereby calibrating the stereo-vision area As of the left and right cameras 10L and 10R.

Thereafter, when the wire or bar 214 and the calibration chart 200 are raised by the lifting device, the vehicle V passes under the wire or bar 214 and the calibration chart 200 and is sent to the next step of the manufacturing line. As described above, according to the camera calibration method CM of the present embodiment, the camera 10 of the stereo camera device 100 can be calibrated in the manufacturing line of the vehicle V without reducing the efficiency of the manufacturing line.

Furthermore, according to the camera calibration method CM of the present embodiment, the monocular-vision areas Am of the left and right cameras 10L and 10R can be calibrated by imaging the wire or the bar 214, similarly to the camera calibration method CM of the first embodiment described above. In addition, according to the camera calibration method CM of the present embodiment, after the calibration of the monocular-vision areas Am of the left and right cameras 10L and 10R is completed, the calibration chart 200 is photographed by the left and right cameras 10L and 10R, so that the stereo-vision areas As of the left and right cameras 10L and 10R can be continuously calibrated. As a result, it is possible to efficiently perform calibration of the left and right cameras 10L and 10R of the stereo camera device 100.

As described above, according to the present embodiment, it is possible to provide the camera calibration method CM and the stereo camera device 100 capable of easily calibrating the wide-angle camera 10 that captures an image through the windshield WS.

Third Embodiment

Figure 15:
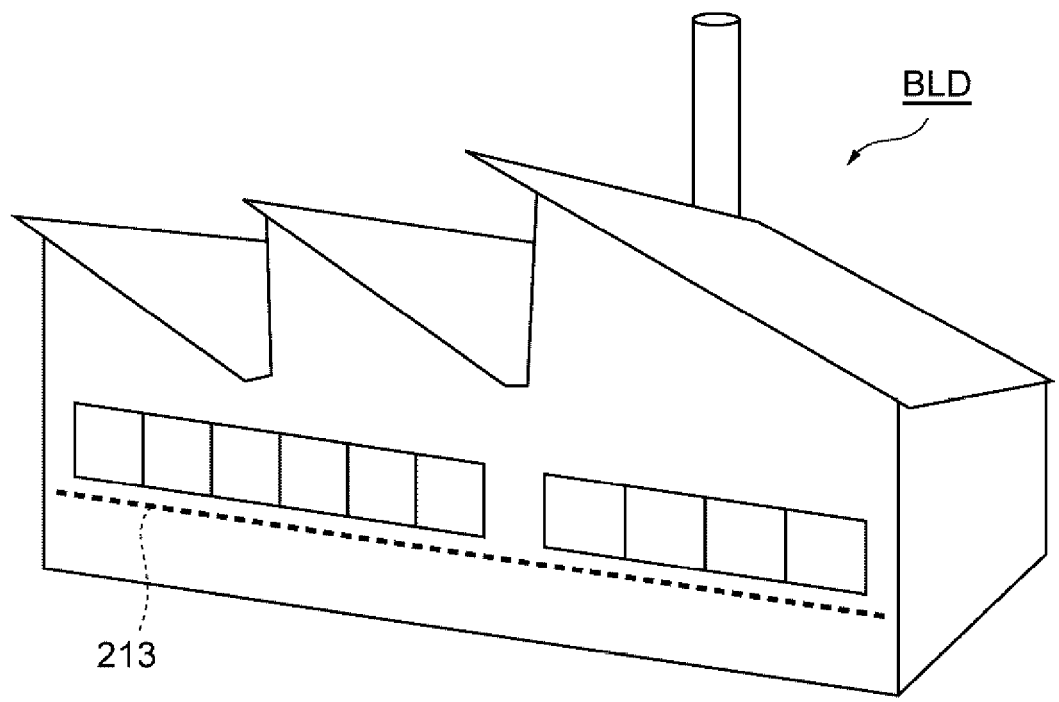
FIG. 15 is a perspective view of a calibration object in a third embodiment of the camera calibration method of the present disclosure.

Hereinafter, a third embodiment of a camera calibration method according to the present disclosure will be described using FIG. 15 with reference to FIGS. 1 to 5. FIG. 15 is a perspective view illustrating an example of a calibration object in the third embodiment of the camera calibration method according to the present disclosure.

The camera calibration method CM of the present embodiment is different from the camera calibration method CM of the first embodiment described above in that a calibration object imaged by the camera 10 through the windshield WS in the step S1 of acquiring a calibration image is a building BLD. Since the other points of the camera calibration method CM of the present embodiment are similar to those of the camera calibration method CM of the first embodiment described above, the same reference numerals are given to similar parts, and the description thereof will be omitted.

In the present embodiment, when the step S1 of acquiring the calibration image is started, the stereo camera device 100 images the building BLD having the linear portion 213 extending in one direction intersecting the stereo-vision area As of the camera 10 through the windshield WS by the camera 10. In the example illustrated in FIG. 15, the building BLD is, for example, a factory having a window frame portion extending in the horizontal direction as the linear portion 213. Note that the building BLD is not particularly limited as long as the building BLD has the linear portion 213, and may be an office building, a shopping mall, or the like.

Thereafter, the stereo camera device 100 performs the step S2 of extracting the linear portion image Im213 corresponding to the linear portion from the calibration image obtained by imaging the building BLD having the linear portion 213, similarly to the first embodiment described above. Further, the stereo camera device 100 performs the step S3 of correcting the distortion of the calibration image based on the linear portion image Im213 and the virtual linear portion image assumed in a case where the linear portion 213 is imaged without through the windshield WS by the camera 10, similarly to the first embodiment described above.

According to the camera calibration method CM of the present embodiment, it is possible to obtain not only the same effects as those of the camera calibration method CM of the first embodiment described above can be obtained, but also the effect that the camera calibration method CM can be performed without modifying the manufacturing line since the calibration chart 200 is not required. Furthermore, the camera calibration method CM of the present embodiment can also correct a shift of an image due to a temporal change of the stereo camera device 100 or a temperature change.

Fourth Embodiment

Figure 16A:
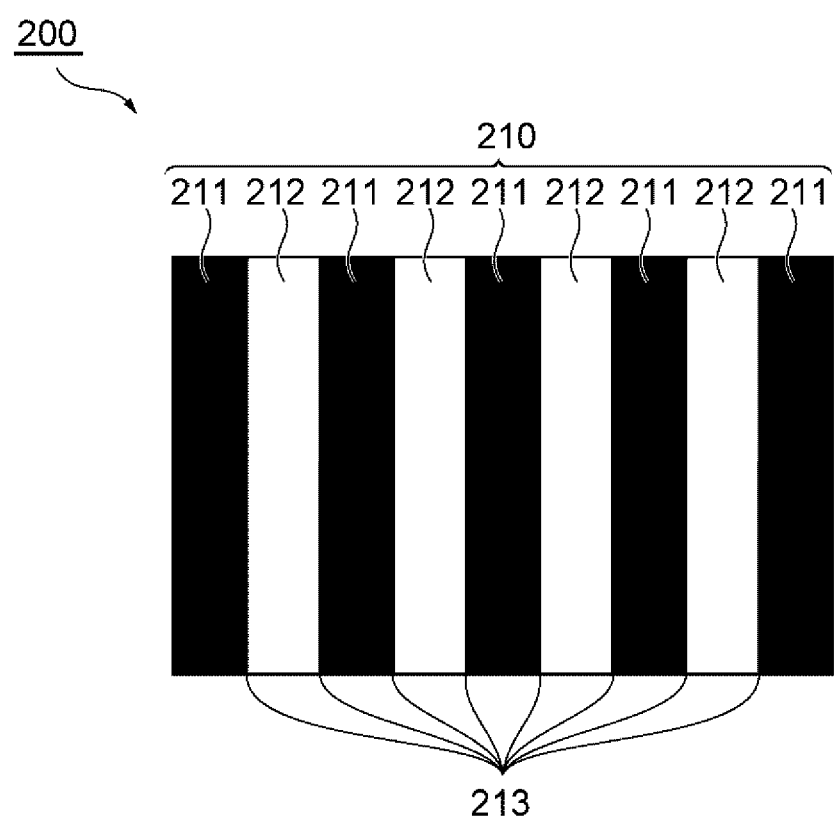
FIG. 16A is a front view of the calibration chart of a fourth embodiment of the camera calibration method of the present disclosure.
Figure 16B:
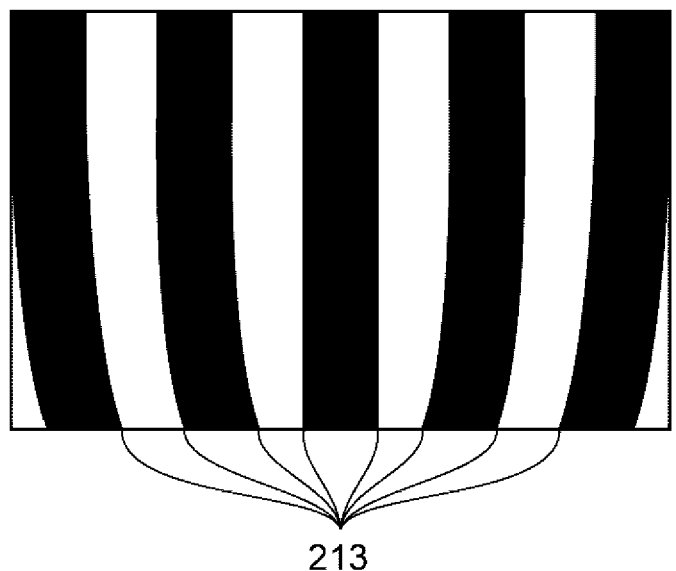
FIG. 16B is an image diagram of the camera that captures the calibration chart illustrated in FIG. 16A.
Figure 17:
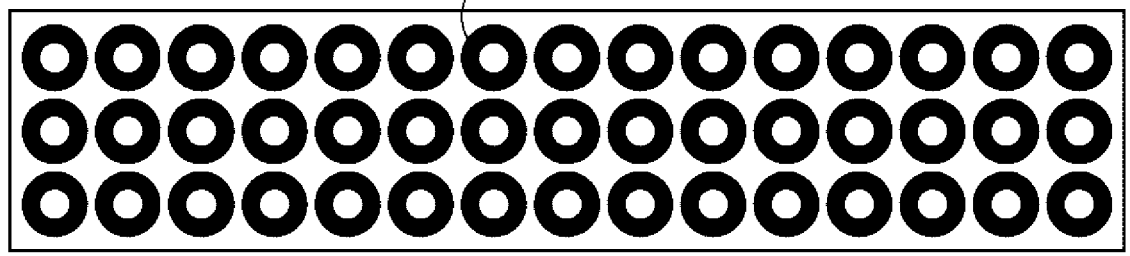
FIG. 17 is a front view of a second calibration chart of the fourth embodiment of the camera calibration method of the present disclosure.

Hereinafter, a fourth embodiment of a camera calibration method according to the present disclosure will be described using FIGS. 16A, 16B, and 17 with reference to FIGS. 1 to 5. FIG. 16A is a front view of a first calibration chart 200 in the fourth embodiment of the camera calibration method of the present disclosure. FIG. 16B is an image diagram of the camera 10 that images the first calibration chart illustrated in FIG. 16A. FIG. 17 is a front view of a second calibration chart 300 in the camera calibration method CM of the present embodiment.

The camera calibration method CM of the present embodiment detects and calibrates a pixel shift in the horizontal direction due to refraction of light transmitted through the windshield WS. Furthermore, in the present embodiment, the stereo camera device 100 does not have, for example, the monocular-vision area Am illustrated in FIG. 1, and the imaging areas AL and AR of the left and right cameras 10L and 10R entirely overlap with each other in the stereo-vision area As. In addition, the stereo camera device 100 does not include, for example, both of the left and right monocular image generation unit 60 and the hybrid object detection unit 70 illustrated in FIG. 2.

Similarly to the calibration chart 200 of the first embodiment, the first calibration chart 200 is a calibration chart 200 having a stripe calibration pattern 210. The stripe calibration pattern 210 of the calibration chart 200 is, for example, a pattern in which band-shaped dark color portions 211 and band-shaped light color portions 212 extending along the vertical direction are alternately arranged in the horizontal direction. The calibration chart 200 includes the linear portion 213 extending in one direction intersecting the optical axis OA of the camera 10. The linear portion 213 is, for example, a boundary line between the dark color portion 211 and the light color portion 212 of the stripe calibration pattern 210 drawn in the calibration chart 200, and extends in the vertical direction orthogonal to the optical axis OA of the camera 10.

In the step S1 of acquiring the calibration image, in the calibration image Im200 of the calibration chart 200 captured through the windshield WS by the camera 10, as illustrated in FIG. 16B, the pixel shift in the horizontal direction increases as the position of the wide angle of view in the horizontal direction and the vertical direction. Therefore, in the present modification, by performing the step S2 of extracting linear portion image Im213 and the step S3 of correcting the distortion of calibration image Im200, similarly to the first embodiment described above, the pixel shift in the horizontal direction can be corrected, and the same effect as that of the first embodiment can be obtained.

Thereafter, the stereo camera device 100 calibrates the absolute value of the parallax of the stereo-vision area As of the left and right cameras 10L and 10R using the second calibration chart 300 illustrated in FIG. 17. The stereo camera device 100 images the calibration chart 300 arranged at a predetermined distance from the left and right cameras 10L and 10R. Next, the distances between the left and right cameras 10L and 10R and the calibration chart 300 are changed. Thereafter, the stereo camera device 100 images the calibration chart 300.

Note that the calibration chart 300 has the dimension in the horizontal direction larger than the dimension in the vertical direction, and the calibration chart 300 is imaged in the entire stereo-vision area As. Next, the stereo camera device 100 detects distortion based on a change in the barycentric position of the calibration pattern 301 of the calibration chart 300 captured by changing the distance and a change amount of the distance, and calibrates the left and right cameras 10L and 10R using the detected distortion.

According to the present embodiment, the relative pixel shift in the horizontal direction of the linear portion image Im213 is corrected using the first calibration chart 200, and the absolute value of the distortion is calibrated using the second calibration chart 300, thereby calibrating the entire visual field. As the calibration object, instead of the calibration chart 200, the building BLD having the vertical linear portion 213 or the wire or bar 214 arranged in the vertical direction can also be used.

Although the embodiments of the camera calibration method and the stereo camera device according to the present disclosure have been described in detail with reference to the drawings, the specific configuration is not limited to this embodiment, and design changes and the like without departing from the gist of the present disclosure are included in the present disclosure.

For example, instead of the stripe calibration pattern 210 of the calibration chart 200 illustrated in FIG. 7A, the calibration chart 200 in which only the straight line corresponding to the linear portion 213 is drawn may be used as the calibration object used in the step S1 of acquiring the calibration image. In addition, as the calibration object, an object obtained by projecting a straight line corresponding to the linear portion 213 on a wall surface of a building, a screen, or the like by a projector may be used. As the calibration object, an object in which a plurality of wires or bars 214 extending in the horizontal direction are installed at equal intervals in the vertical direction may be used.

Figure 18:
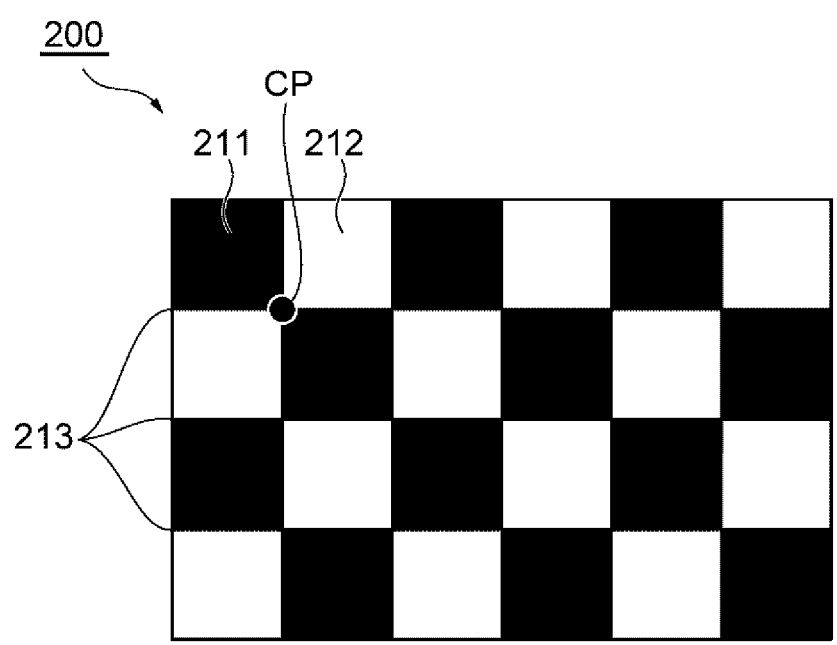
FIG. 18 is a front view illustrating a modification of the calibration chart illustrated in FIG. 7A.

In addition, the calibration chart 200 having a check pattern as illustrated in FIG. 18 may be used as the calibration object used in the step S1 of acquiring the calibration image. In this case, by detecting the boundary between the dark color portion 211 and the light color portion 212 as the linear portion 213, the linear portion 213 crossing the entire calibration chart 200 can be extracted.

On the other hand, in the conventional camera calibration method using the calibration chart of the check pattern, for example, a center point CP of the four sections in which the dark color portions 211 are arranged at the upper left and the lower right and the light color portions 212 are arranged at the upper right and the lower left is detected. Therefore, when the calibration chart 200 is brought close to the lens 11, the resolution is lowered, and the detection of the point CP at the center of the four sections varies, which may cause an error in the calibration.

REFERENCE SIGNS LIST 10 camera
20 image processing unit (acquisition unit, extraction unit, and correction unit)
100 stereo camera device
200 calibration chart (calibration object)
210 calibration pattern
213 linear portion
214 wire or bar (calibration object)
BLD building (calibration object)
CM camera calibration method
Im200 calibration image
Im213 linear portion image
OA optical axis
WS windshield

The invention claimed is:

1. A camera calibration method for calibrating a camera that captures an image through a windshield, the camera calibration method comprising:
   acquiring a calibration image by imaging, by the camera, a calibration object having a linear portion extending in one direction intersecting an optical axis of the camera through the windshield, wherein the calibration object is a wire or a bar;
   extracting a first linear portion image corresponding to the linear portion from the calibration image; and
   correcting distortion of the calibration image by comparing the first linear portion image with a second linear portion image captured when the linear portion is imaged, by the camera, not through the windshield.

2. The camera calibration method according to claim 1, wherein acquiring the calibration image includes imaging the calibration object, the calibration image including the first linear portion image from one end to another end in one direction intersecting the optical axis of the camera.

3. The camera calibration method according to claim 1, wherein correcting distortion of the calibration image includes correcting an inclination angle of the first linear portion image.

4. The camera calibration method according to claim 1, wherein acquiring the calibration image includes imaging the calibration object arranged at a position in front of the windshield of a vehicle in an optical axis direction of the camera and above the vehicle in a vertical direction.

5. The camera calibration method according to claim 1, wherein correcting distortion of the calibration image includes correcting distortion due to a lens characteristic of the camera.

6. The camera calibration method according to claim 1, wherein the calibration object is a calibration chart having a stripe calibration pattern.

7. The camera calibration method according to claim 1, wherein the calibration object is a building.

8. The camera calibration method according to claim 1, wherein acquiring the calibration image includes relatively moving the camera and the calibration object.

9. A stereo camera device comprising a stereo camera that captures an image through a windshield and one or more central processing units (CPUs) configured to:
- acquire a calibration image by imaging, by the stereo camera, a calibration object having a linear portion extending in one direction intersecting an optical axis of the stereo camera through the windshield, wherein the calibration object is a wire or a bar;
- extract a first linear portion image corresponding to the linear portion from the calibration image; and
- correct distortion of the calibration image by comparing the first linear portion image and a second linear portion image captured when the linear portion is imaged, by the stereo camera, not through the windshield.

* * * * *